(No Model.) 2 Sheets—Sheet 1.

W. H. JOHNSON.
NUT MAKING MACHINE.

No. 380,393. Patented Apr. 3, 1888.

Witnesses:
Geo. W. Young.
N. E. Oliphant

Inventor.
Wm. H. Johnson.
By Stunt & Underwood,
Attorneys.

(No Model.) 2 Sheets—Sheet 2.
W. H. JOHNSON.
NUT MAKING MACHINE.
No. 380,393. Patented Apr. 3, 1888.
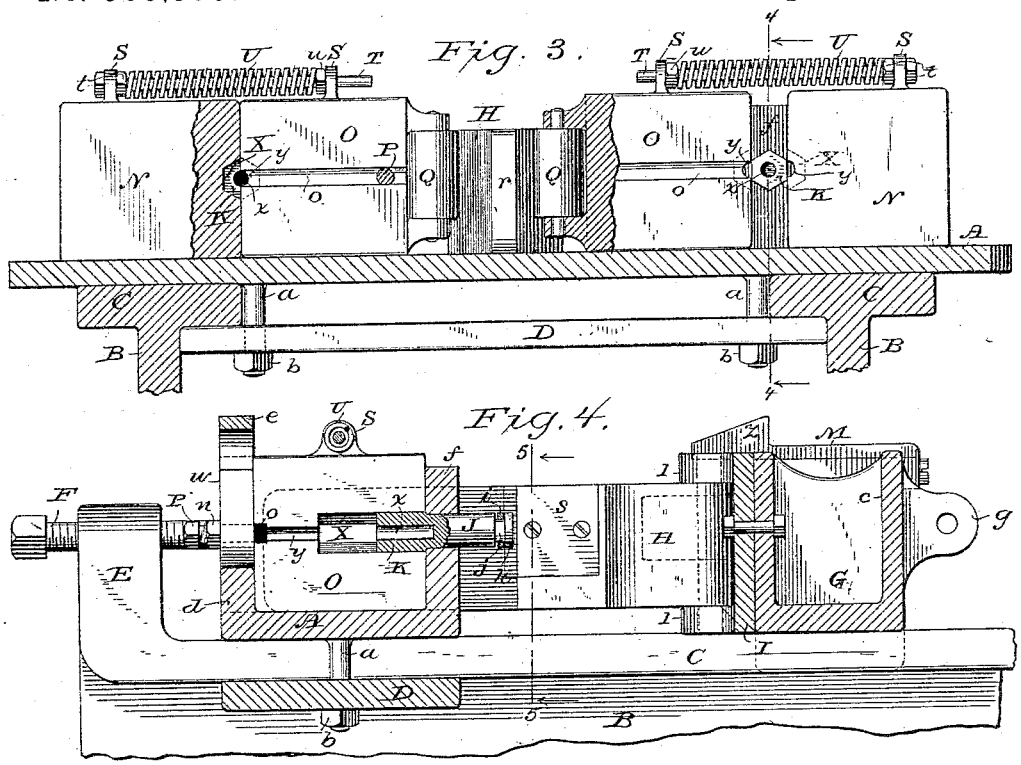
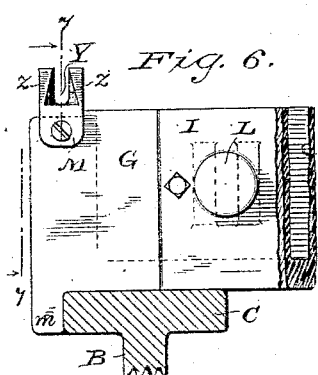
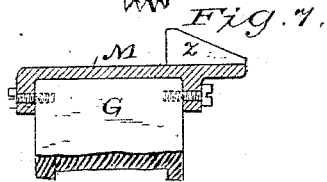
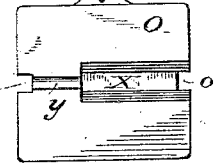
Witnesses
Geo. W. Young.
N. E. Oliphant
Inventor
Wm H. Johnson
By Stout & Underwood
Attorneys

UNITED STATES PATENT OFFICE.

WILLIAM H. JOHNSON, OF RACINE, ASSIGNOR TO THE ELASTIC NUT COMPANY, OF MILWAUKEE, WISCONSIN.

NUT-MAKING MACHINE.

SPECIFICATION forming part of Letters Patent No. 380,393, dated April 3, 1888.

Application filed July 11, 1887. Serial No. 243,964. (No model.)

*To all whom it may concern:*

Be it known that I, WILLIAM H. JOHNSON, of Racine, in the county of Racine, and in the State of Wisconsin, have invented certain new and useful Improvements in Nut-Making Machines; and I do hereby declare that the following is a full, clear, and exact description thereof.

My invention relates to machines for making nuts; and it consists of certain devices adapted to be attached to and operated by a machine furnishing a reciprocating movement to a cross-head moving over a stationary bed, (such, for example, as shown in my Patent No. 326,746, for combined gang-punch and bending-machine, granted to me September 22, 1885,) all as will be fully set forth hereinafter, and pointed out in the claims.

Figure 1:
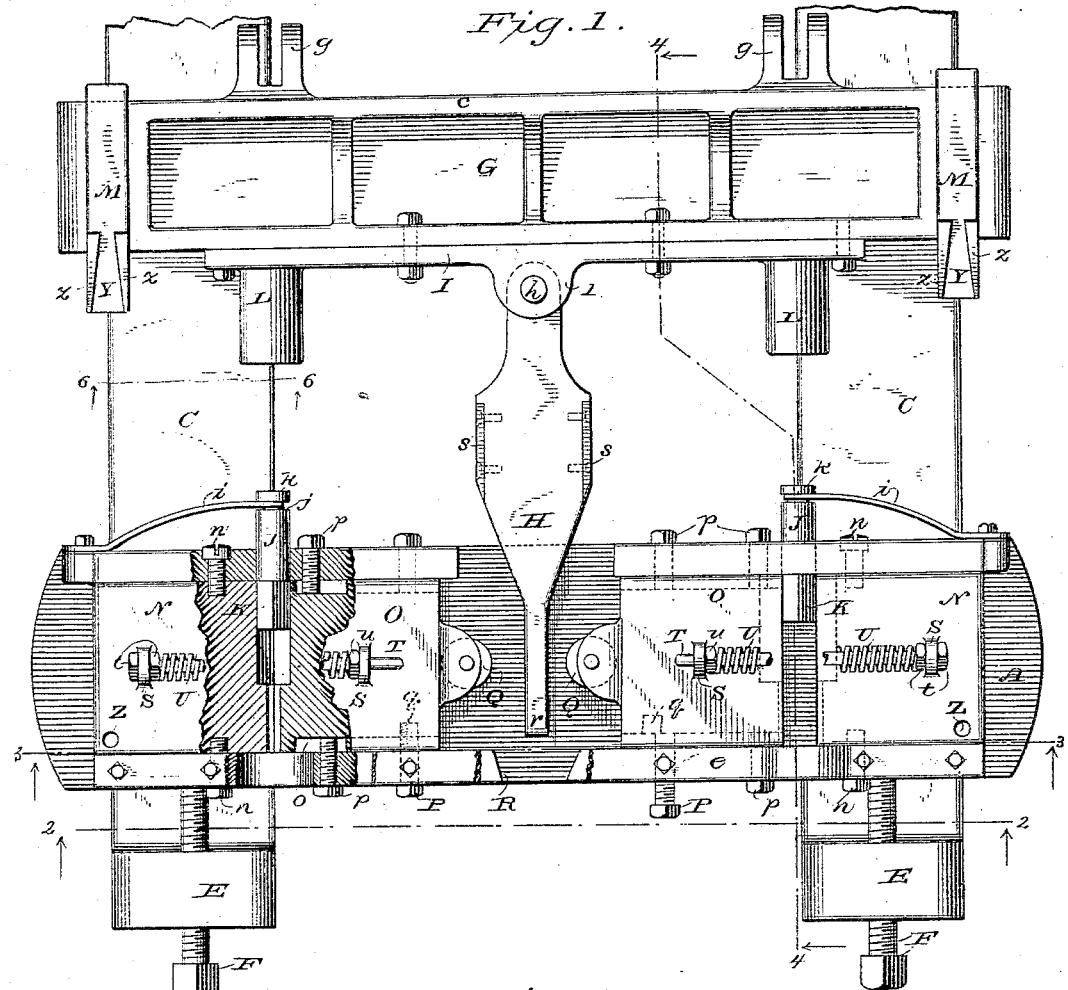
Figure 2:
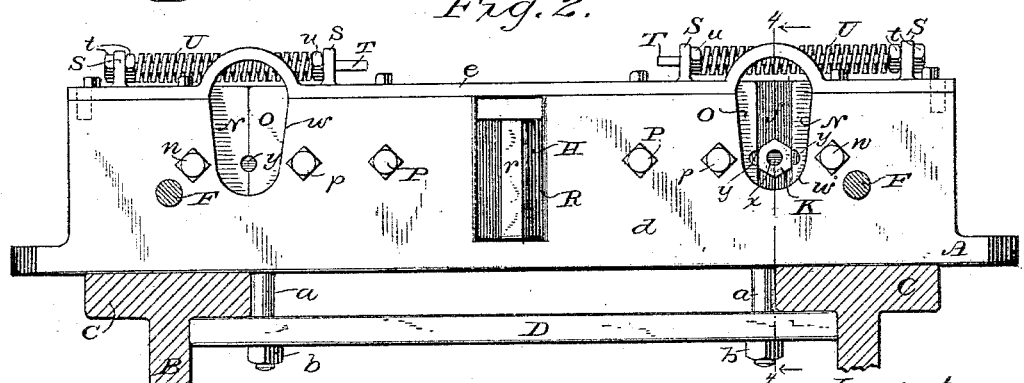

In the drawings, Figure 1 is a plan view of my said present invention, partly broken away to better illustrate details of construction. Fig. 2 is an end view, partly in section, on the line 2 2 of Fig. 1. Fig. 3 is a transverse sectional view on the line 3 3 of Fig. 1. Fig. 4 is a longitudinal sectional view on the line 4 4 of Figs. 1, 2, and 5. Fig. 5 is a detail view in section on the line 5 5 of Fig. 4. Fig. 6 is another detail view in section on the line 6 6 of Fig. 1. Fig. 7 is a detail section on the line 7 7 of Fig. 6. Figs. 8, 9, and 10 are detail views of one of the die-blocks, the plunger and mandrel bearing a completed nut, respectively. Figs. 11 and 12 are end views representing, respectively, the nut-blank and nut on the mandrel.

The object of my present invention is the formation of nuts from metal blanks previously bent into a general U shape, with beveled ends, as indicated best in the detail views, Fig. 11, and I have utilized that portion of my patented device hereinbefore named, which carries and reciprocates the angle-bending head, substituting a different head and adding new mechanism between the reciprocating head and the upturned end bearings of the flanged guides or ways of the side pieces of the machine-bed.

From the base (not shown) of the machine rise the side pieces, B, provided on their upper edges with flanged guides or ways C, and a brace-piece, D, extends between the sides B just under the inner flanges, C, of each side, and is held up to place by bolts *a* and nuts *b*, which bolts project downward from the bottom plate, A, of the die-block frame, to be hereinafter described.

The extreme ends of the guides or ways C are formed into upturned bearings E, through which extend set-screws F, which bear against the front wall, *d*, of the die-block frame, for the purpose of adjusting the distance between the said frame and the reciprocating cross-head G, from whose rear wall, *c*, project studs *g*, to receive connecting-rods (not shown, but analogous to those in my said prior patent) which are connected to eccentrics, pulleys, or crank-arms on the driving-shaft, so as to insure the desired reciprocation of the said cross-head G, the parts marked B, C, E, F, *c*, and *g* being practically the same in operation in my present device as in my said patent.

Above the front wall, *d*, of the die-block frame is a top strip, *e*, secured thereto by suitable screw-bolts, and the said frame has a rear wall, *f f*, centrally open or separated for the admission of the wedge-bar H, whose rear end is pivoted at *h* between lugs *l l* on a transverse plate, I, which is in turn securely bolted to the front wall of the cross-head G. The extreme outer ends of the divided rear wall, *f f*, of the die-block frame carry retracting-springs *i i*, whose free ends are forked to grasp the necks *j* of plungers J, which are seated in and project through holes in the described rear walls, *f*, as shown in Fig. 4, and these plungers (shown in detail in Fig. 9) bear at their inner ends crowners K of increased diameter, so that the retracting force of the springs *i* cannot pull them out of their holes or seats. The transverse plate I carries stamps L L, designed, in the forward reciprocation of the cross-head G and plate I, to press against the heads *k* of the plungers J, and these stamps L are exactly opposite the lugs *g* on the rear wall of the cross-head G, as the greatest strain comes opposite these points. The cross-head G is preferably made with front and rear walls with intermediate strengthening-webs, as shown, and each end of the cross-head G bears the stripping devices M, securely fastened, as by bolts, thereto, as best shown in Figs. 6 and 7, while the bottom of each end of the cross-head G is continued into a guide-lug, m, to engage with the outer flange, C, of each side piece, B.

N N are the stationary die-blocks, and O O are the movable die-blocks, the former being held in place between the front and rear walls, d f, of the die-block frame by the screw-bolts n n, while the latter have on each side longitudinal grooves o o, which receive the ends of screw-bolts P p p, which thus form guides for the die-blocks O to move on. Each block O is also provided with a hole, q, so that if it is desired that only one side of the machine shall be operative at any time the block O in question may be pushed toward its companion block, N, till this hole q is opposite the point of the screw P, and the latter then screwed into the hole q, thus holding the block O at one side of the path of the wedge-bar H, as shown at the left in Fig. 1. Each block O carries an anti-friction roller, Q, which are normally in the path of the inclined faces of the wedge-bar H, as shown in Fig. 3 and at the right of Fig. 1, while as the said bar is pivoted at h, when it is thrust forward and is to operate on only one side of the machine the inclined wedge-surface to the left of Fig. 1 will just pass by the left roller, Q, with only slight contact, and the whole force of the thrust will be directed against the roller Q at the right of said figure, forcing the right-hand block, O, toward its companion block, N, there being a wide-enough opening, R, with beveled edges in the front wall, d, of the die-block frame to permit the passage of the front end, r, of the wedge-bar H therethrough, no matter whether it be straight or inclined to either side. On each side of the widest part of the wedge-bar back of the inclined edges are friction-plates s s, which may be unscrewed and other plates slipped in back of them before they are replaced to increase the width of the bar at this point.

From the top of each die there rises a perforated lug, S, through which there extends a rod, T, uniting each pair of dies, and which rod is held by nuts t t firmly to the lug of the die N, while another nut, u, is on the inside of the lug of the die O, and between the nut u and the inner nut, t, the rod bears a spring, U, whose function is to normally force the die O away from the die N, except when the said die O is forced toward its companion die, N, by the wedge-bar H.

V is a steel mandrel having a hooked end, v, and on this mandrel the previously-bent U-shaped blank W is placed, as shown in Fig. 11, while at a red heat, and pushed through the opening w in the front wall, d, of the die-block frame and between the open but adjacent faces of the dies N and O, the point of the mandrel extending into the perforation x in the crowner K, and then as the cross-head G and attached plate I begin the forward movement the action of the wedge-bar H against the anti-friction wheel Q will force the die-block O toward the companion die-block, N, thereby shaping the blank into the form of a nut between the die-surfaces X in said blocks, and as the blocks approach the mandrel is received between the semicircular grooves y in each block, and at the last the stamps L are thrust against the heads k of the plungers J, and the crowners K at the opposite ends of said plungers are forced in against the hot-metal piece, forming a crown and completing the nut. As the cross-head G, with its attachments, moves backward in its reciprocation, the mandrel, with the perfect nut thereon, Fig. 10, is pulled back through the hole w in the front wall of the die-block frame (the springs U forcing the die-blocks O away from the die-blocks N) and placed over the stripping devices M, with the nut W just beyond the teeth z z, and the mandrel resting in the channel Y between them, and then the bent end v of the mandrel is slipped into the hole Z in the block N, and as the cross-head G completes its backward movement the nut is automatically stripped therefrom. These nuts are what are technically known as "blank nuts," and are designed to be subsequently tapped in any desired manner.

Having thus fully described my invention, what I claim as new, and desire to secure by Letters Patent, is—

1. In a nut-making machine, the combination of a stationary and a movable die-block, with a plunger and a mandrel interposed between the die-blocks, and mechanism for forcing the plunger forward and the movable die-block against the stationary die-block, substantially as set forth.

2. In a nut-making machine, the combination of a stationary and a movable die-block connected by a rod furnished with a retracting-spring for normally forcing said die-blocks apart, a plunger seated in the wall of the die-block frame and provided with a retracting-spring, a mandrel interposed between the die-blocks, and a reciprocating cross-head carrying a wedge-bar for forcing the movable die-block against the stationary die-block, and a stamp for forcing the plunger forward between the said die-blocks, substantially as set forth.

3. In a nut-making machine, the combination of a suitable bed consisting of side pieces having flanged guides or ways, a die-block frame clamped thereto and carrying blocks provided with perforations, a reciprocating cross-head moving on said bed and carrying stripping devices, and mandrels having bent rear ends adapted for insertion in the said perforations and front ends adapted for lodgment in channels between the teeth of the stripping devices, substantially as set forth.

4. In a nut-making machine, the combination of a suitable bed consisting of side pieces having flanged guides or ways, a die-block frame clamped thereto, stationary die-blocks secured in said frame, and transversely-movable die-blocks sliding between the walls thereof, a reciprocating cross-head moving on said bed, and a wedge-bar pivotally connected to said cross-head and adapted to move against and thereby impart transverse motion to the said movable die-blocks, substantially as set forth.

In testimony that I claim the foregoing I have hereunto set my hand, at Milwaukee, in the county of Milwaukee and State of Wisconsin, in the presence of two witnesses.

WILLIAM H. JOHNSON.

Witnesses:
  H. G. UNDERWOOD,
  MAURICE F. FREAR.